United States Patent
Ganoe et al.

(10) Patent No.: US 10,822,970 B2
(45) Date of Patent: Nov. 3, 2020

(54) GAS TURBINE ENGINE STRUCTURAL GUIDE VANES

(71) Applicant: UNITED TECHNOLOGIES CORPORATION, Farmington, CT (US)

(72) Inventors: William Richard Ganoe, Vernon, CT (US); Thomas B. Hyatt, Cromwell, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 799 days.

(21) Appl. No.: 14/919,207

(22) Filed: Oct. 21, 2015

(65) Prior Publication Data

US 2016/0130958 A1 May 12, 2016

Related U.S. Application Data

(60) Provisional application No. 62/076,172, filed on Nov. 6, 2014.

(51) Int. Cl.
*F01D 9/02* (2006.01)
*F01D 5/14* (2006.01)
(Continued)

(52) U.S. Cl.
CPC .............. *F01D 9/02* (2013.01); *F01D 5/147* (2013.01); *F01D 9/041* (2013.01); *F01D 25/005* (2013.01);
(Continued)

(58) Field of Classification Search
CPC . F01D 5/147; F01D 9/02; F01D 9/041; F01D 25/005; F01D 5/14; F01D 5/18; F01D 5/188; F01D 5/28; F01D 5/282; F01D 5/284; F02C 3/04; F02K 3/04; F04D 29/023; F04D 29/542; F05D 2220/36; F05D 2300/43; Y02T 50/672
See application file for complete search history.

(56) References Cited

U.S. PATENT DOCUMENTS

| 4,594,761 A | * | 6/1986 | Murphy | ............... B23P 15/04 |
| | | | | 29/418 |
| 5,626,462 A | * | 5/1997 | Jackson | ............... C22C 32/00 |
| | | | | 416/229 A |

(Continued)

FOREIGN PATENT DOCUMENTS

| EP | 1908920 A2 | 4/2008 |
| GB | 2418460 A | 3/2006 |
| WO | 2006068599 | 6/2006 |

OTHER PUBLICATIONS

Gunston (Editor), Janes Aero-Engines [2000], Jane's Information Group Limited, 7th Edition, p. [8]-[11].*

(Continued)

*Primary Examiner* — Jason H Duger
(74) *Attorney, Agent, or Firm* — Cantor Colburn LLP

(57) ABSTRACT

A structural guide vane may include a first root, a second root positioned radially outward from the first root and a truss extending between the first root and second root. The truss may be made of a first material. The guide vane may further include an overmold made of a second material that surrounds the truss to form an airfoil.

20 Claims, 5 Drawing Sheets

(51) Int. Cl.
  *F02C 3/04* (2006.01)
  *F01D 25/00* (2006.01)
  *F04D 29/02* (2006.01)
  *F04D 29/54* (2006.01)
  *F02K 3/04* (2006.01)
  *F01D 9/04* (2006.01)

(52) U.S. Cl.
  CPC .................. *F02C 3/04* (2013.01); *F02K 3/04* (2013.01); *F04D 29/023* (2013.01); *F04D 29/542* (2013.01); *F05D 2220/36* (2013.01); *F05D 2300/43* (2013.01); *Y02T 50/60* (2013.01)

(56) References Cited

U.S. PATENT DOCUMENTS

| | | | | |
|---|---|---|---|---|
| 5,634,771 A * | 6/1997 | Howard | ........ | F01D 5/147 416/229 R |
| 6,821,087 B2 * | 11/2004 | Matsumoto | ........ | F01D 5/282 415/191 |
| 7,291,407 B2 * | 11/2007 | Merrill | ........ | C04B 35/185 428/701 |
| 7,575,417 B2 * | 8/2009 | Finn | ........ | F01D 5/147 416/230 |
| 7,785,076 B2 * | 8/2010 | Morrison | ........ | C04B 41/009 416/233 |
| 8,177,513 B2 * | 5/2012 | Shim | ........ | B23P 15/04 29/889.7 |
| 2008/0072569 A1 * | 3/2008 | Moniz | ........ | F01D 5/147 60/226.1 |
| 2008/0159856 A1 * | 7/2008 | Moniz | ........ | F01D 5/147 415/198.1 |

OTHER PUBLICATIONS

European Search Report for Application No. 15193502.0-1610; dated Apr. 19, 2016; 8 pgs.

* cited by examiner

GAS TURBINE ENGINE STRUCTURAL GUIDE VANES

CROSS REFERENCE TO RELATED APPLICATIONS

This application is a non-provisional application claiming the 35 USC § 119(e) benefit of U.S. Provisional Patent Application No. 62/076,172 filed on Nov. 6, 2014.

FIELD OF THE DISCLOSURE

This disclosure generally relates to gas turbine engines and, more specifically, relates to structural guide vanes for gas turbine engines.

BACKGROUND OF THE DISCLOSURE

Gas turbine engines are well known internal combustion engines typically used to provide thrust to an aircraft or to provide power for land-based operations. Generally speaking, a gas turbine engine includes a fan, a compressor, a combustor and a turbine arranged in a serial fashion. The fan draws in ambient air as it rotates and moves it to the compressor where the air is compressed or pressurized. The compressed air is then communicated to the combustor where it is mixed with fuel and ignited. The products of the combustion are hot gases which are then directed into the turbine. This causes the airfoils of the turbine to rotate, and as the turbine is mounted on the same shaft, or shafts, as the compressor and fan, this causes the compressor and fan to rotate as well. Accordingly, once started, it can be seen that operation of the engine is self-sustaining in that the combustion of more fuel causes more rotation of the turbine and in turn the compressor and the fan. Moreover, the rotation of the fan, which typically has a diameter many times that of the compressor and the turbine, cause the engine to generate thrust.

Current engine design is pursuing ever increasing fan diameter as a means to increase engine thrust. With this movement to larger fans, the guide vanes that are positioned downstream of a fan now not only need to redirect any circumferentially directed flow component of air from the blade to an axially directed flow, they must also act as a structural component helping to carry the weight of the casing that surrounds the fan.

While effective, current structural guide vanes suffer in that they are solid and relatively heavy due to their weight. The gas turbine engines to which these structural guide vanes are connected require increased fuel consumption to offset the loss in trust created by their weight. Thus, while certain gas turbine engine structural guide vanes are known, improvements to guide vanes in the area of weight, while maintaining necessary structural performance, is desired.

SUMMARY OF THE DISCLOSURE

In accordance with one aspect of the present disclosure, a structural guide vane is disclosed. The structural guide vane may comprise a first root, a second root positioned radially outward of the first root and a truss extending between the first root and the second root. The truss may be made of a first material. The guide vane may further include an overmold made of a second material and the overmold may surround the truss to form an airfoil.

In a refinement of the structural guide vane, the airfoil may have a leading edge, a trailing edge, a first side extending between the leading edge and trailing edge, and a second side extending between the leading edge and the trailing edge.

In another refinement of the structural guide vane, the first material may be selected from the group consisting of metal, metal alloy, composite material and combinations thereof.

In another refinement of the structural guide vane, the second material may be less dense than the first material.

In another refinement, the second material may be selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

In another refinement, the second material may be selected from the group consisting of graphite-fiber composites, ceramics, poly(p-phenylene-2,6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

In accordance with another aspect of the present disclosure, a guide vane assembly is disclosed. The guide vane assembly may comprise a first flowpath endwall, a second flowpath endwall positioned radially outward of and circumscribing the first flowpath endwall and at least one structural guide vane positioned between the first and second flowpath endwalls. The at least one structural guide vane may include a first root, a second root positioned radially outward of the first root and a truss extending between the first root and the second root. The truss may be made of a first material. The at least one guide vane may further include an overmold made of a second material and the overmold may surround the truss to form an airfoil.

In a refinement of the guide vane assembly, the airfoil may have a leading edge, a trailing edge, a first side extending between the leading edge and trailing edge, and a second side extending between the leading edge and the trailing edge.

In another refinement of the guide vane assembly, the first material may be selected from the group consisting of metal, metal alloy, composite material and combinations thereof.

In another refinement of the guide vane assembly, the second material may be less dense than the first material.

In another refinement of the guide vane assembly, the second material may be selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

In another refinement of the guide vane assembly, the second material may be selected from the group consisting of graphite-fiber composites, ceramics, poly(p-phenylene-2, 6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

In accordance with another aspect of the present disclosure, a gas turbine engine is disclosed. The gas turbine engine may comprise a compressor section, a combustor section downstream of the compressor section and a fan section upstream of the compressor section. The fan section may further include at least one structural guide vane, the at least one structural guide vane including a first root, a second root positioned radially outward from the first root and a truss extending between the first and second root. The truss may be made of a first material. The at least one structural guide vane may further include an overmold made of a second material surrounding the truss to form an airfoil.

In a refinement of the gas turbine engine, the airfoil may have a leading edge, a trailing edge, a first side extending between the leading edge and trailing edge, and a second side extending between the leading edge and the trailing edge.

In another refinement of the gas turbine engine, the first material may be selected from the group consisting of metal, metal alloy, composite material and combinations thereof.

In another refinement of the gas turbine engine, the second material may be less dense than the first material.

In another refinement of the gas turbine engine, the second material may be selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

In another refinement of the gas turbine engine, the second material may be selected from the group consisting of graphite-fiber composites, ceramics, poly(p-phenylene-2, 6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

In another refinement of the gas turbine engine, the fan section may further include a first flowpath endwall, a second flowpath endwall positioned radially outward of and circumscribing the first flowpath endwall and the first root may be coupled to the first flowpath endwall and the second root may be coupled to the second flowpath endwall.

In another refinement of the gas turbine engine, the second material may further surround the first and second roots and the first and second flowpath endwalls.

These and other aspects and features of the present disclosure will be more readily understood when read in conjunction with the accompanying drawings.

DETAILED DESCRIPTION OF THE DISCLOSURE

Figure 1:
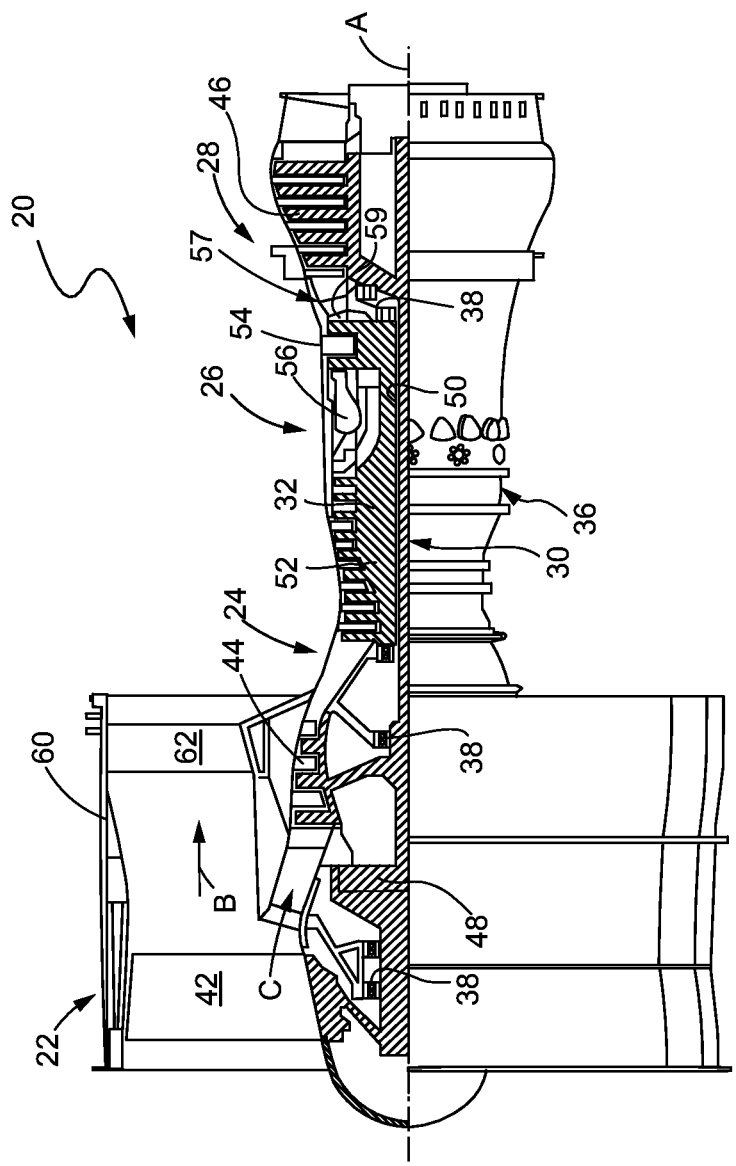
FIG. 1 is a side, partially cross-sectional view of a gas turbine engine constructed in accordance with the present disclosure.

Referring now to the drawings, and with specific reference to FIG. 1, a gas turbine engine is shown and generally referred to by reference numeral 20. The gas turbine engine 20 disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B, while the compressor section 24 drives air along a core flowpath C for compression and communication into the combustor section 26. As will be described in further detail herein, in the combustion section 26, the compressor air is mixed with fuel and ignited, with the resulting combustion gases then expanding in turbine section 28. Although depicted as a turbofan gas turbine engine in the disclosed non-limiting embodiment, it should be understood that the concepts described herein are not limited to use with turbofans as the teachings may be applied to other types of turbine engines including, but not limited to, three-spool architectures as well.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan blade assembly 42, a low pressure (or first) compressor section 44 and a low pressure (or first) turbine section 46. The inner shaft 40 is connected to the fan blade assembly 42 through a geared architecture 48 to drive the fan assembly 42 at a lower speed than the low speed spool 30. The high speed spool 32 includes an outer shaft 50 that interconnects a high pressure (or second) compressor section 52 and high pressure (or second) turbine section 54. The outer shaft 50 is typically concentric with and radially outward from the inner shaft 50. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed first by the low pressure compressor 44, and then by the high pressure compressor 52, before being mixed and burned with fuel in the combustor 56, and lastly expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a high-bypass engine a greater volume of air moves along a bypass flowpath B than through core airflow C. The ratio of the mass of air moving through bypass flowpath B to core airflow C is known as the bypass ratio. In a one example, the engine 20 bypass ratio may be greater than about six (6), while in another example the bypass ratio may be greater than ten (10), the geared architecture 48 may be an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

Figure 2:
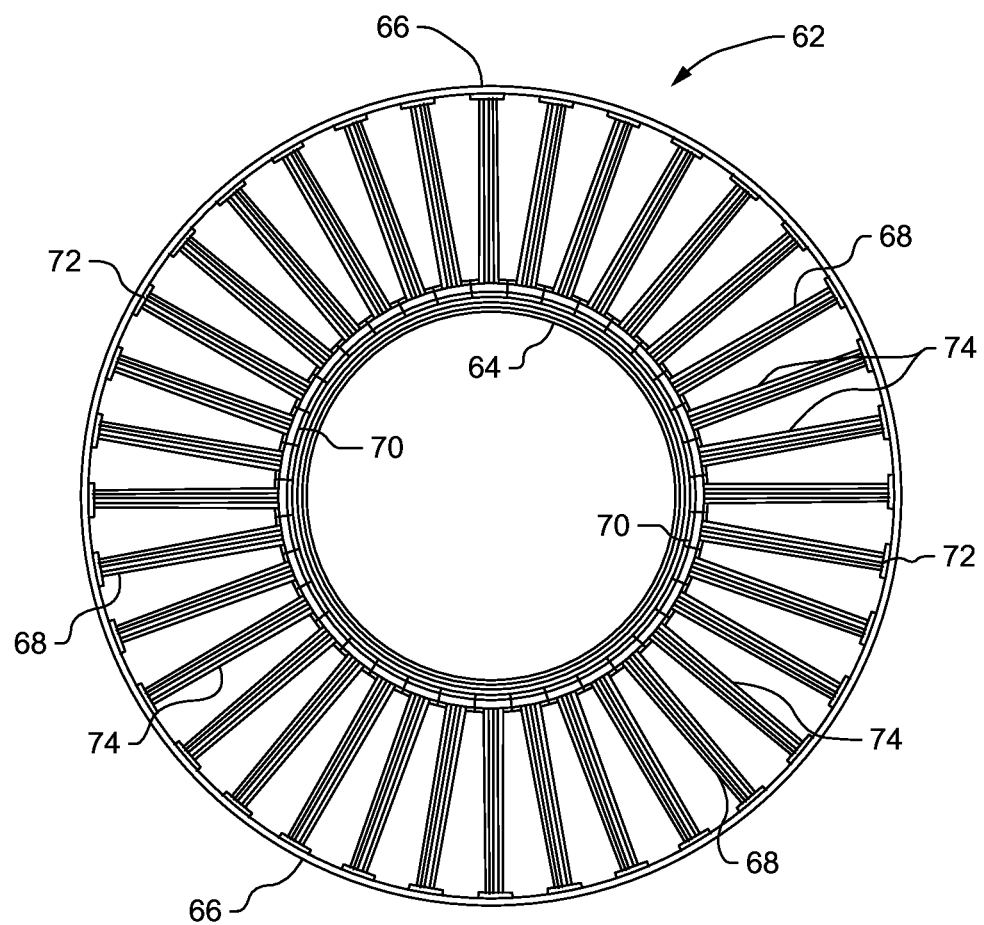
FIG. 2 is a plan-view of a guide vane assembly constructed in accordance with the present disclosure from aft the fan blade assembly of FIG. 1 towards the guide vane assembly.

Now turning to FIGS. 1-2, the fan section 22 may further include a fan casing 60 that extends forward from the fan blade assembly 42 and rearwards towards the compressor section 24. The fan section may also include a guide vane assembly 62 constructed in accordance with the present disclosure.

The fan casing 60 may generally be cylindrical in shape and surround both the fan blade assembly 42 and the guide vane assembly 62. The guide vane assembly 62 may generally be circular in shape and may surround the compressor section 24. The guide van assembly 62 may also be positioned along axis A such that it is located aft the fan blade assembly thereby redirecting a circumferentially directed flow component of the airflow moving along bypass flowpath B.

The guide vane assembly 62 may include a first flowpath endwall 64 that is coupled to the compressor section 22 of the gas turbine engine 20. The first flowpath endwall 64 may generally have a circular shape and may be coupled to the compressor section 22 through the use of mechanical fasteners or by welding. Alternatively, the first flowpath endwall 64 may be coupled to the compressor section 22 by the use of an adhesive, such as an epoxy based adhesive. Some examples of epoxy based adhesives that may be utilized to adhere the first flowpath endwall 64 to the compressor section 24 include bisphenol A resins, bisphenol F resins, novolac resins, aliphatic epoxy resins and glycidylamine resins. Alternatively, the first flowpath endwall 64 may be coupled to the compressor section 24 through a combination of mechanical fastening and adhesive or through a mechanical means without an adhesive.

The first flowpath endwall 64 may be comprised of a metal, metal alloy, composite material and combinations thereof. While the following list is not meant to be exhaustive, the metals from which the first flowpath endwall 64 may be comprised include aluminum, titanium and nickel. Some examples of metal alloys from which the first shroud 64 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. When using a metal or metal alloy, the first flowpath endwall 64 may be manufactured by casting, forging or near-net forging.

Examples of composite materials from which the first flowpath endwall 64 may be made include graphite-fiber composites, ceramics, poly (p-phenylene-2,6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites. When made from a composite material, the first flowpath endwall 64 may be manufactured by a composite lay-up structure process. The material, or combination of materials, chosen to manufacture the first flowpath endwall 64 may be dependent on a combination of factors such as necessary structural performance in combination with the placement of the guide vane assembly 62 in a hotter or cooler section of the gas turbine engine 20, as will be understood by a skilled artisan.

The guide vane assembly 62 may further include a second flowpath endwall 66 that may be positioned radially outward of and circumscribe the first flowpath endwall 64. The second flowpath endwall 66 may generally be circular in shape and may further be coupled to the fan casing 60. In one instance, the second flowpath endwall 66 may be coupled to the casing 60 by the use of an epoxy based adhesive, such as bisphenol A resins, bisphenol F resins, novolac resins, aliphatic epoxy resins and glycidylamine resins. In another instance, the second flowpath endwall 66 is coupled to the fan casing 60 by the used of mechanical fasteners or by welding. Alternatively, the second flowpath endwall 66 may be coupled to the fan casing 60 by any combination of adhesive, welding and/or mechanical fastening.

The second flowpath endwall 66 may be comprised of a metal, metal alloy, composite material and combinations thereof. While the following list is not meant to be exhaustive, the metals from which the second flowpath endwall 66 may be made include aluminum, titanium and nickel. Some examples of metal alloys from which the second flowpath endwall 66 may be made include aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INC- ONEL 718+®, INCONEL 939® or HAYNES 282®. When using a metal or metal alloy, the second flowpath endwall 66 may be manufactured by casting, forging or near net-forging.

Furthermore, while the following list is not meant to be exhaustive, examples of composite materials from which the second flowpath endwall 66 may be made include graphite-fiber composites, ceramics, poly(p-phenylene-2,6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites. When manufacturing the second flowpath endwall 66 with a composite material, it may be made utilizing a composite lay-up structure process. The material, or combination of materials, chosen to manufacture the second flowpath endwall 66 may be dependent on a combination of factors such as necessary structural performance in combination with the placement of the guide vane assembly 62 in a hotter or cooler section of the gas turbine engine 20, as will be understood by a skilled artisan.

Alternatively, the first flowpath endwall 64 and second flowpath endwall 66 may be made of one or more polymeric materials. Polymers that may be utilized to manufacture the first and second flowpath endwalls 64, 66 include, but are not meant to be limited to, those that are disclosed in Table 1 below.

TABLE 1

| Name | Acronym, Tradename or Common Name |
|---|---|
| Low Density Polyethylene | LDPE |
| High Density Polyethylene | HDPE |
| Polypropylene | PP |
| Polystyrene | PS |
| Polytetrafluroethylene | PTFE |
| Polyvinyl Chloride | PVC |
| Polyvinyl Acetate | PVA |
| Polyacrylonitrile | PAN |
| Phenol Formaldehyde Resins | Bakelite ® |
| Polyamide | Nylon |
| Polyimide | PI |
| poly(p-phenylene-2,6-bisoxazole) | PBO |
| Polyvinyl Butyral | PBA |
| Natural Rubber | Rubber |
| Polyisoprene | Synthetic Rubber |
| Polyacrylate Rubber | PAR |
| Ethylene-acrylate Rubber | EAR |
| Polyester Urethane | PER |
| Bromo Isobutylene Isoprene | Bromobutyl |
| Polybutadiene | BUNA ® |
| Chloro Isobutylene Isoprene | Butyl Rubber |
| Chlorosulphonated Polyethylene | Hypalon |
| Acrylonitrile Butadiene | BUNA-N ® |
| Polyether Urethane | PU, Polyurethane |
| Fluoronated Hydrocarbon | Viton ® |
| Ethylene Propylene | EP |
| Polyurethane | PU |
| Styrene Butadiene | BUNA-S ® |
| Hydrogenated Nitrile Butadiene | HNBR |
| Vinyl Methyl Silicone | Silicone Rubber |
| Isobutylene Isoprene Butyl | Butyl Rubber |
| Polyethylene Terephthalate | PET |

Figure 3:
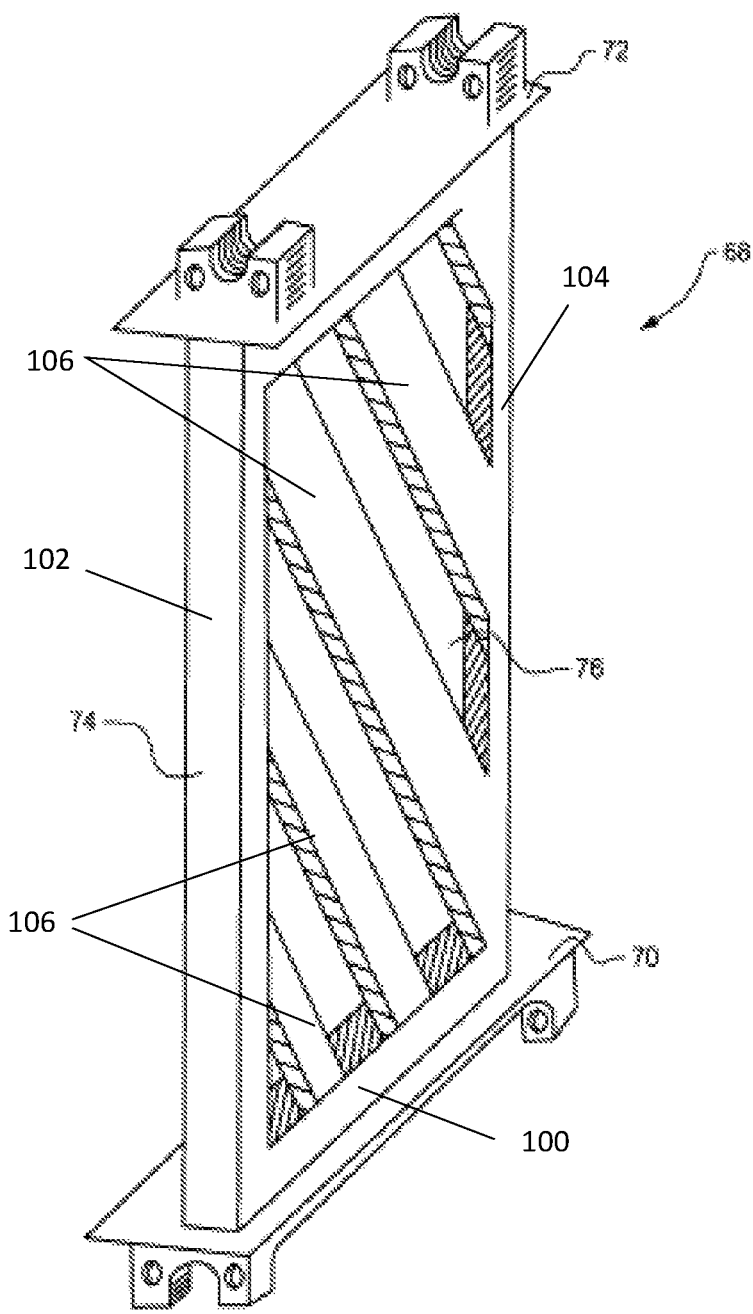
FIG. 3 is a perspective view of the roots and truss of a structural guide vane manufactured in accordance with the present disclosure.

The guide vane assembly 62 may further include at least one structural guide vane 68 positioned between the first flowpath endwall 64 and the second flowpath endwall 66, thereby acting as structural support to hold the fan casing 60 in position around fan blade assembly 42 and the remainder of the gas turbine engine 20. As is depicted in FIGS. 2-3, the structural guide vane 68 may comprise a first root 70, and the first root may be coupled to the first flowpath endwall 64. The structural guide vane 68 may further include a second root 72 positioned radially outward of the first root 70, and this second root may be coupled to the second flowpath endwall 66. The guide vane 68 may further include a truss 74 that extends between the first root 70 and the second root 72. The roots 70, 72 may be coupled to their respective flowpath endwalls 64, 66 by the use of an epoxy based adhesive, such as bisphenol A resins, bisphenol F resins, novolac resins, aliphatic epoxy resins and glycidylamine resins. Alternatively, the roots 70, 72 may be coupled to their respective flowpath endwalls 64, 66 by the use of mechanical fasteners or by welding. Alternatively, the roots 70, 72 may be coupled to their respective flowpath endwalls 64, 66 by any combination of adhesive, welding and/or mechanical fastening. As shown in FIG. 3, the truss 74 includes a radially inboard truss element 100 located at the first root 70, and a leading edge element 102 and trailing edge element 104. A plurality of diagonal truss elements 106 positioned between the leading edge element 102 and the trailing edge element 104. Each diagonal truss element 106 extends nonparallel to the leading edge element 102 and the trailing edge element 104. Each diagonal truss element 106 has a first element side and a second element side opposite the first element side. At least one diagonal truss element 106 of the plurality of diagonal truss elements 106 extends from the radially inboard truss element 100 to the leading edge element 102.

The guide vane 68, and its attendant roots 70, 72 and truss 74, may generally be made as one piece. The materials from which the roots 70, 72 and truss 74 may be comprised includes, but is not limited to, metals, metal alloys, composite materials and combinations thereof. The composite materials from which the roots 70, 72 and truss 74 may be made include graphite-fiber composites, ceramics, poly(p-phenylene-2,6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites. When manufacturing the roots 70, 72 and truss 74 with a composite material, it may be made utilizing a composite lay-up structure process.

Alternatively, casting, forging or near-net forging may be utilized to manufacture the roots 70, 72 and truss 74. When undertaking one of these processes, the metal alloys that may be used to make roots 70, 72 and truss 74 include, but are not necessarily limited to, aluminum alloys, steel, nickel alloys and titanium alloys, such as series 2000, 6000 or 7000 aluminum, 300 and 400 series stainless steels, precipitation hardenable stainless steels, Ti-6Al-4V, Ti-6Al-2Sn-4Zr-2Mo, WASPALOY®, INCONEL 718®, INCONEL 718+®, INCONEL 939® or HAYNES 282®. When using one of the afore-mentioned processes, the metals that may be used to make the roots 70, 72 and truss 74 include made include aluminum, titanium and nickel. As will be understood, the material or combination of materials chosen to manufacture the roots 70, 72 and truss 74 may be dependent on a combination of factors such as necessary structural performance in combination with the placement of the guide vane assembly 62 in a hotter or cooler section of the gas turbine engine 20.

Figure 4:
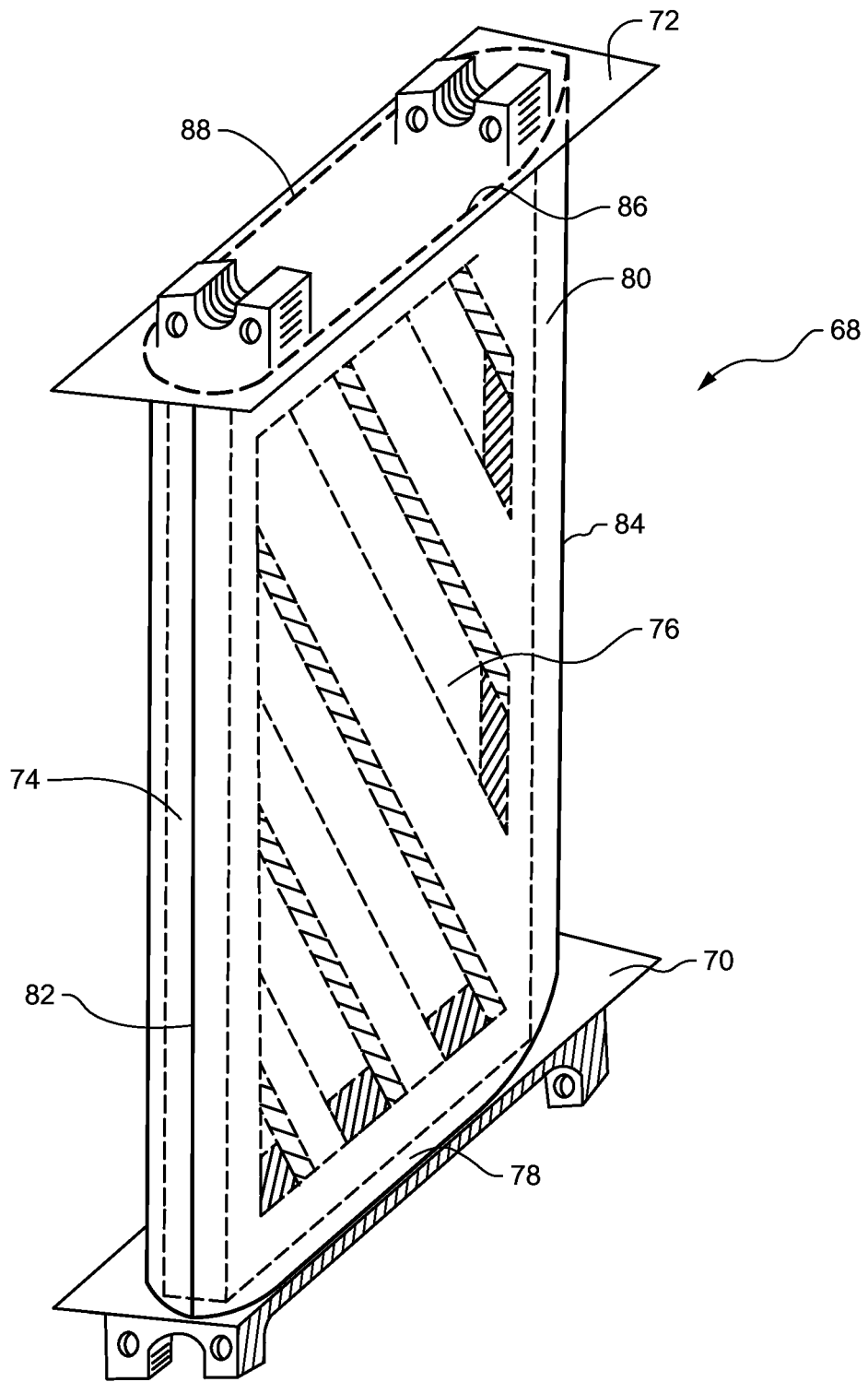
FIG. 4 is a perspective view of a structural guide van manufactured in accordance with the present disclosure depicting an overmold surrounding the roots and truss of FIG. 3.

Furthermore, as is shown in FIGS. 3-4, the truss 74 may further include at least one void 76 through the truss. As will be understood by a person of skill in the art, the at least one void 76 is present to minimize the weight of the structural guide vane 68, yet is of appropriate size and location such that necessary structural performance of the guide vane 68 to hold the fan casing 60 in position around fan blade assembly 42 and the remainder of the gas turbine engine 20 is maintained.

These, however, are not the only features of the structural guide vane 68 that is made in accordance with the present disclosure. As is depicted in FIG. 4, the truss 74 portion may be surrounded with an overmold 78 that forms an airfoil 80. The airfoil 80 may further include a leading edge 82, a trailing edge 84. Moreover, the overmold 78 may include a first side 86 that extends between the leading edge 82, trailing edge 84, the first root 70 and second root 72. Furthermore, the airfoil 80 may include a second side 88 that may extend between the leading edge 82, the trailing edge 84, the first root 70 and the second root 72. The airfoil 80 may be used to redirect a circumferentially directed flow component of the airflow moving along bypass flowpath B to an axially directed flow component.

The overmold 78 may be made of a material that is different than the material utilized to manufacture the roots 70, 72 and truss 74. In one instance, the material utilized to manufacture the overmold 78 is less dense than the material utilized to make the roots 70, 72 and truss 74. In one instance, the material utilized to manufacture the overmold 78 is a polymer. Polymers that may be utilized to manufacture the overmold 80 that surrounds the truss 74 include, but are not limited to, those that are disclosed in Table 2 below.

TABLE 2

| Name | Acronym, Tradename or Common Name |
|---|---|
| Low Density Polyethylene | LDPE |
| High Density Polyethylene | HDPE |
| Polypropylene | PP |
| Polystyrene | PS |
| Polytetrafluroethylene | PTFE |
| Polyvinyl Chloride | PVC |
| Polyvinyl Acetate | PVA |
| Polyacrylonitrile | PAN |
| Phenol Formaldehyde Resins | Bakelite ® |
| Polyamide | Nylon |
| Polyimide | PI |
| poly(p-phenylene-2,6-bisoxazole) | PBO |
| Polyvinyl Butyral | PBA |
| Natural Rubber | Rubber |
| Polyisoprene | Synthetic Rubber |
| Polyacrylate Rubber | PAR |
| Ethylene-acrylate Rubber | EAR |
| Polyester Urethane | PER |
| Bromo Isobutylene Isoprene | Bromobutyl |
| Polybutadiene | BUNA ® |
| Chloro Isobutylene Isoprene | Butyl Rubber |
| Chlorosulphonated Polyethylene | Hypalon |
| Acrylonitrile Butadiene | BUNA-N ® |
| Polyether Urethane | PU, Polyurethane |
| Fluoronated Hydrocarbon | Viton ® |
| Ethylene Propylene | EP |
| Polyurethane | PU |
| Styrene Butadiene | BUNA-S ® |
| Hydrogenated Nitrile Butadiene | HNBR |
| Vinyl Methyl Silicone | Silicone Rubber |
| Isobutylene Isoprene Butyl | Butyl Rubber |
| Polyethylene Terephthalate | PET |

When manufacturing the overmold 78 from a polymer, the overmold may be created by injection molding or casting. When utilizing injection molding, the truss 74 may be placed inside a mold that has the shape of the airfoil 80. Then a thermoplastic polymer, such as polypropylene, may be heated and then injected into a mold to form the overmold 78 in the shape of the airfoil 80 that surround the truss 74. If a thermoset polymer, such as natural rubber, is used to surround the truss 74, then the material may be cast and vulcanized into the shape of the airfoil 80. Then, the appropriately shaped overmold 78 and then cut into an overmold 78 may be placed around the truss 74 to form the guide vane 68.

In further instantiations, the overmold 78 may also surround the first root 70 and second root 72 of the structural guide vane 68. This may be done in in order to decrease the resistance to airflow past the guide vane assembly 62 as the coating overmold may form a smoother surface without the need to polish the guide vane 68 as is customarily done. Furthermore, the overmold 78 may also further surround the first flowpath endwall 64 and the second flowpath endwall 66 to decrease the resistance to airflow past the guide vane assembly 62 in order to remove a polishing step customarily undertaken when forming current guide vane assemblies.

Figure 5:
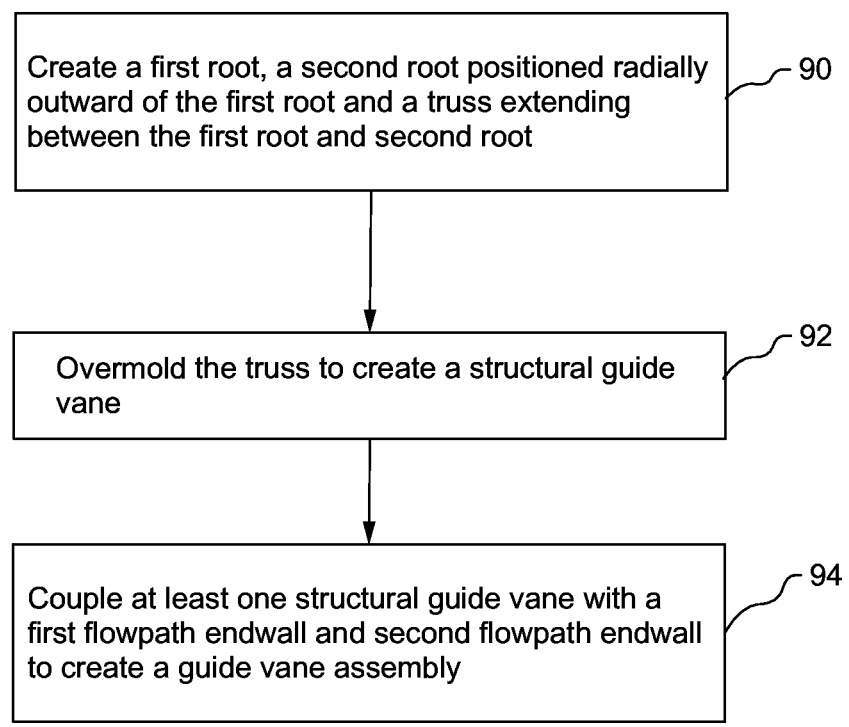
FIG. 5 is a flowchart depicting a sample sequence of steps which may be practiced in accordance with a method of manufacturing a guide vane assembly of the present disclosure.

While the foregoing describes a gas turbine engine 20, a guide vane assembly 62 and a structural guide vane 68, the present disclosure also recites methods for making a guide vane assembly 62. An embodiment of this method is depicted in the flowchart in FIG. 5. As is shown in this chart, the method may include the first step 90 of creating a first root 70, a second root 72 positioned radially outward of the first root and a truss 74 that extends between the first root and the second root. As has been described above, the roots 70, 72 and truss 74 may be made as a single piece and comprised of metal, metal alloys, composite materials and combinations thereof per the materials described above. When using a metal or metal alloy, the roots 70, 72 and truss 74 may be created by casting, forging or near-net forging. When created with a composite material, the roots 70, 72 and truss 74 may be created by a composite lay-up structure process.

In a next step 92, the truss 74 may be overmolded to form a structural guide vane 68. As described above, this overmold 78 may form and airfoil 80, and the airfoil may have a leading edge 82, a trailing edge 84 and a first side 86 that extends between the leading edge and trailing edge and the first root 70 and second root 72. Furthermore, the airfoil 80 may further include a second side 88 that may extend between the leading edge 82, the trailing edge 84, the first root 70 and the second root 72. As discussed above, the material utilized to manufacture the overmold 78 may be different that the material used to make the roots 70, 72 and truss 74. Furthermore, this second material may be less dense than the material utilized to make the roots 70, 72 and truss 74. As has been described above, the material utilized to manufacture the overmold 78 may be a polymer from the list disclosed above. Furthermore, the polymer may be injection-molded or cast to form the overmold 78 as has been discussed above.

In a next step 94 of making a guide vane assembly 62, at least one structural guide vane 68 manufactured in accordance with step 92 may be coupled to a first flowpath endwall 64 and second flowpath endwall 66. As will be noted, each of the flowpath endwalls 64, 66 may be made from the list of materials described above. In addition, the at least one structural guide vane may be coupled to the flowpath endwalls 64, 66 through the roots 70, 72 by the use of an epoxy based adhesive, mechanical fastening or by welding, or some combination thereof, as has been described above.

As described above, the flowpath endwalls 64, 66 may alternatively be made from one or more polymeric materials listed in Table 1. When making flowpath endwalls 64, 66 from a polymeric material, these flowpath endwalls may be co-molded along with the overmold 68. Thus, in this process, the truss 74 may be overmolded to form the airfoil 80, the roots 70,72 may be overmolded with the same polymeric material, and the flowpath endwalls 64, 66 may be formed from the same polymeric material. In this instance, however, a completed guide vane assembly 68 may be formed. As will be understood, this alternative may be manufactured with the same injection molding or casting processes that may be utilized to manufacture the overmold 78 from a polymer described above.

Steps 90 and 94 may be repeated as necessary to create, overmold and attach as many structural guide vanes 68 to the flowpath endwalls 64, 66 as is required to create a completed guide vane assembly 68. Thus, in one instance, the guide vane assembly 62 includes at least six structural guide vanes 68 manufactured in accordance with the present disclosure. In another instance, the guide vane assembly 62 includes at least 12 structural guide vanes 68 manufactured in accordance with the present disclosure. In another instance, the guide vane assembly 62 includes at least 24 structural guide vanes 68 manufactured in accordance with the present disclosure. In a further instance, the guide vane assembly 62 includes at least 36 structural guide vanes 68 manufactured in accordance with the present disclosure. In another instantiation, the guide vane assembly 62 includes at least 44 structural guide vanes 68 manufactured in accordance with the present disclosure.

INDUSTRIAL APPLICABILITY

In operation, the structural guide vane can find use in many industrial settings including, but not limited to, gas turbine engines for use in aircraft. More specifically, various structural guide vanes having reduced weight while maintaining structural resilience are disclosed. The structural guide vanes disclosed herein may include a first root, a second root positioned radially outward from the first root and a truss extending between the first root and second root. The truss may be made of a first material. The truss may have at least one void therethrough to minimize the weight of the structural guide vane while being appropriately sized and placed to maintain the necessary structural performance for a guide vane to maintain the fain casing in position around the fan blade assembly and the remainder of the gas turbine engine.

The guide vane may further include an overmold made of a second material that surrounds the truss and forms an airfoil. The second material may be less dense than the first material to reduce the weight of the structural guide vane in combination with the truss. Furthermore, the airfoil may be used to redirect a circumferentially directed flow component of the airflow moving along the bypass flowpath of the gas turbine engine.

The above description is meant to be representative only, and thus modifications may be made to the embodiments described herein without departing from the scope of the disclosure. Thus, these modifications fall within the scope of present disclosure and are intended to fall within the appended claims.

What is claimed is:

1. A structural guide vane, comprising:
a first root;
a second root, the second root positioned radially outward from the first root;
a truss extending between the first root and the second root and including a radially inboard truss element located at the first root, a leading edge element and a trailing edge element, the truss made of a first material and including a plurality of diagonal truss elements disposed between the leading edge element and the trailing edge element, each diagonal truss element of the plurality of diagonal truss elements extending non-parallel to the leading edge element and the trailing edge element, each diagonal truss element of the plurality of diagonal truss elements having a first element side and a second element side opposite the first element side, the truss including at least one void between adjacent diagonal truss elements of the plurality of diagonal truss elements extending through the truss, at least one diagonal truss element of the plurality of diagonal truss elements extending from the radially inboard truss element to the leading edge element;
an overmold, the overmold made of a second material, the overmold applied at each first element side of the plurality of diagonal truss elements to define a first airfoil side and applied at each second element side of the plurality of diagonal truss elements to define a second airfoil side, surrounding each truss element of the plurality of diagonal truss elements, the leading edge element and the trailing edge element to form an airfoil thereby enclosing the at least one void between the first airfoil side and the second airfoil side.

2. The structural guide vane according to claim 1, wherein the airfoil has a leading edge, a trailing edge, the first airfoil side extending between the leading edge and the trailing edge, and the second airfoil side extending between the leading edge and the trailing edge.

3. The structural guide vane according to claim 1, wherein the first material is a metallic material.

4. The structural guide vane of claim 1, wherein the second material is less dense than the first material.

5. The structural guide vane according to claim 4, wherein the second material is selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

6. The structural guide vane according to claim 4, wherein the second material is selected from the group consisting of graphite-fiber composites, ceramics, poly(p-phenylene-2, 6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

7. The structural guide vane according to claim 1, wherein the overmold is applied to one or more of the first root or the second root.

8. A guide vane assembly, comprising:
a first flowpath endwall;
a second flowpath endwall positioned radially outward of and circumscribing the first flowpath endwall; and
at least one structural guide vane positioned between the first flowpath endwall and the second flowpath endwall, the at least one structural guide vane including:
a first root;
a second root, the second root positioned radially outward from the first root;
a truss extending between the first root and the second root and including a radially inboard truss element located at the first root, a leading edge element and a trailing edge element, the truss made of a first material and including a plurality of diagonal truss elements disposed between the leading edge element and the trailing edge element, each diagonal truss element of the plurality of diagonal truss elements extending nonparallel to the leading edge element and the trailing edge element, each diagonal truss element of the plurality of diagonal truss elements having a first element side and a second element side opposite the first element side, the truss including at least one void between adjacent diagonal truss elements of the plurality of diagonal truss elements extending through the truss, at least one diagonal truss element of the plurality of diagonal truss elements extending from the radially inboard truss element to the leading edge element;
an overmold, the overmold made of a second material, the overmold applied at each first element side of the plurality of diagonal truss elements to define a first airfoil side and applied at each second element side of the plurality of diagonal truss elements to define a second airfoil side, surrounding each diagonal truss element of the plurality of diagonal truss elements, the leading edge element and the trailing edge element to form an airfoil thereby enclosing the at least one void between the first airfoil side and the second airfoil side.

9. The guide vane assembly according to claim 8, wherein the airfoil has a leading edge, a trailing edge, the first airfoil side extending between the leading edge and the trailing edge, and the second airfoil side extending between the leading edge and the trailing edge.

10. The guide vane assembly according to claim 8, wherein the first material is a metallic material.

11. The guide vane assembly according to claim 8, wherein the second material is less dense than the first material.

12. The guide vane assembly according to claim 11, wherein the second material is selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

13. The guide vane assembly according to claim 11, wherein the second material is selected from the group consisting of graphite-fiber composites, ceramics, poly(p-phenylene-2, 6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

14. A gas turbine engine, comprising:
a compressor section;
a combustor section downstream of the compressor section; and
a fan section upstream of the compressor section, the fan section including at least one structural guide vane, the at least one structural guide vane including:
a first root;
a second root, the second root positioned radially outward from the first root;
a truss extending between the first root and the second root and including a radially inboard truss element located at the first root, a leading edge element and a trailing edge element, the truss made of a first material and including a plurality of diagonal truss elements disposed between the leading edge element and the trailing edge element, each diagonal truss element of the plurality of diagonal truss elements extending nonparallel to the leading edge element and the trailing edge element, each diagonal truss element of the plurality of diagonal truss elements having a first element side and a second element side opposite the first element side, the truss including at least one void between adjacent diagonal truss elements of the plurality of diagonal truss elements extending through the truss, at least one diagonal truss element of the plurality of diagonal truss elements extending from the radially inboard truss element to the leading edge element;
an overmold, the overmold made of a second material, the overmold applied at each first element side of the plurality of diagonal truss elements to define a first airfoil side and applied at each second element side of the plurality of diagonal truss elements to define a second airfoil side, surrounding each diagonal truss element of the plurality of diagonal truss elements, the leading edge element and the trailing edge element to form an airfoil thereby enclosing the at least one void between the first airfoil side and the second airfoil side.

15. The gas turbine engine according to claim 14, wherein the airfoil has a leading edge, a trailing edge, the first airfoil side extending between the leading edge and the trailing edge, and the second airfoil side extending between the leading edge and the trailing edge.

16. The gas turbine engine according to claim 14, wherein the first material is a metallic material.

17. The gas turbine engine according to claim 14, wherein the second material is less dense than the first material.

18. The gas turbine engine according to claim 17, wherein the second material is selected from the group consisting of Low Density Polyethylene, High Density Polyethylene, Polypropylene, Polystyrene, Polytetrafluroethylene, Polyvinyl Chloride, Polyvinyl Acetate, Polyacrylonitrile, Phenol Formaldehyde Resins, Polyamide, Polyimide, poly(p-phenylene-2, 6-benzobisoxazole), Polyvinyl Butyral, Natural Rubber, Polyisoprene, Polyacrylate Rubber, Ethylene-acrylate Rubber, Polyester Urethane, Bromo Isobutylene Isoprene, Chlorosulphonated Polyethylene, Acrylonitrile Butadiene, Polyether, Urethane, Fluoronated Hydrocarbon, Ethylene Propylene, Polyurethane, Styrene Butadiene, Hydrogenated Nitrile Butadiene, Vinyl Methyl Silicone, Isobutylene Isoprene Butyl, Polyethylene Terephthalate and combinations thereof.

19. The gas turbine engine according to claim 17, wherein the second material is selected from the group consisting of graphite-fiber composites, ceramics, poly(p-phenylene-2, 6-benzobisoxazole) fiber composites, mullite fiber composites, alumina fiber composites, silicon nitride fiber composites, silicon carbide fiber composites, boron fiber composites, boron nitride fiber composites, boron carbide fiber composites, glass fiber composites, titanium diboride fiber composites, and yttria stabilized zirconium fiber composites.

20. The gas turbine engine according to claim 14, wherein the fan section further includes a first flowpath endwall, a second flowpath endwall positioned radially outward of and circumscribing the first flowpath endwall and the first root is coupled to the first flowpath endwall and the second root is coupled to the second flowpath endwall.

* * * * *